United States Patent
Fisher et al.

(10) Patent No.: US 6,887,436 B1
(45) Date of Patent: May 3, 2005

(54) FAST LIGHT-OFF CATALYTIC REFORMER

(75) Inventors: Galen Bruce Fisher, Bloomfield Hills, MI (US); John E. Kirwan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 855 days.

(21) Appl. No.: 09/604,129

(22) Filed: Jun. 27, 2000

(51) Int. Cl.[7] .......................... B01D 53/88; B01D 53/92
(52) U.S. Cl. ..................... 422/177; 422/180; 422/211; 422/222; 48/63; 48/127.1; 48/214 R
(58) Field of Search ............................... 422/168, 173, 422/174, 177, 180, 198, 199, 211, 222; 48/61, 48/62 R, 75, 63, 65, 127.9, 197 R, 198.1, 48/198.7, 211, 212, 214 R, 215, 214 A

(56) References Cited

U.S. PATENT DOCUMENTS

| | | | | |
|---|---|---|---|---|
| 3,775,064 A | * | 11/1973 | Berger et al. | 422/171 |
| 5,997,596 A | * | 12/1999 | Joshi et al. | 48/198.1 |
| 6,096,106 A | * | 8/2000 | Ruhl et al. | 48/197 R |
| 6,126,908 A | * | 10/2000 | Clawson et al. | 422/190 |
| 6,423,896 B1 | | 7/2002 | Keegan | |
| 6,464,947 B2 | | 10/2002 | Balland | |
| 6,481,641 B1 | | 11/2002 | Mieney | |
| 6,485,852 B1 | | 11/2002 | Miller et al. | |
| 6,562,496 B2 | | 5/2003 | Faville et al. | |
| 6,562,502 B2 | | 5/2003 | Haltiner, Jr. | |
| 6,608,463 B1 | | 8/2003 | Kelly et al. | |

* cited by examiner

Primary Examiner—Kiley S. Stoner
Assistant Examiner—Len Tran
(74) Attorney, Agent, or Firm—Paul L. Marshall

(57) ABSTRACT

A fast light-off catalytic reformer and method includes at least one preferably substantially cylindrical reactor tube having an inlet for receiving a flow of fuel and a flow of air, a reforming catalyst disposed within the reactor tube for converting the fuel and air to a reformate stream, and an outlet for discharging the produced reformate stream. An ignition device disposed within the reactor tube initiates an exothermic reaction between the fuel and air. Heat generated thereby provides fast light-off of the reforming catalyst. An associated control system selects fuel and air flow delivery rates and operates the ignition device to achieve fast light-off of the reforming catalyst at start-up and to maintain the catalyst at a temperature sufficient to optimize reformate yield. The rapid production of high yields of reformate is particularly suitable for use in an on-board reforming strategy for meeting SULEV emissions with spark-ignition engines, especially with larger, higher emitting vehicles.

2 Claims, 1 Drawing Sheet

FAST LIGHT-OFF CATALYTIC REFORMER

TECHNICAL FIELD

The present invention relates to a catalytic reformer and method for converting a hydrocarbon stream to a reformate fuel stream comprising hydrogen, and more particularly relates to a fast light-off catalytic reformer and method for rapid production of reformate fuel. The present invention is particularly suitable for on-board production of reformate for hydrogen cold-start in an internal combustion engine. The present invention is also suitable for providing reformate to a fuel cell such as a solid oxide fuel cell.

BACKGROUND OF THE INVENTION

A catalytic hydrocarbon fuel reformer converts a fuel stream comprising, for example, natural gas, light distillates, methanol, propane, naphtha, kerosene, gasoline, diesel fuel, or combinations thereof, and air, into a hydrogen-rich reformate fuel stream comprising a gaseous blend of hydrogen, carbon monoxide and nitrogen (ignoring trace components). In the reforming process, the raw hydrocarbon fuel stream is typically percolated through a catalyst bed or beds contained within reactor tubes mounted in the reformer vessel. The catalytic conversion process is typically carried out at elevated catalyst temperatures in the range of about 1200° F. to about 1600° F.

In most reformers of this type, hot burner gas generated at a burner generally disposed within the reformer vessel accumulates in a primary (typically, upper) plenum within the vessel, contacting and heating the outer surface of the reactor tubes, thereby heating the catalyst. The hot burner gas may be directed through a cylindrical sleeve surrounding the lower portion of each reactor tube, so that the hot burner gas travels in close contact with outer surfaces of the reactor tubes and effective heat transfer occurs. Hot burner gas from the primary plenum flows through a narrow annular passage between the internal wall of the sleeve and the external wall of each reactor tube, and into a secondary (lower) plenum, from which it is discharged. Seal plates or insulation may be employed to prevent bypass of the hot burner gases around the sleeve.

The produced hydrogen-rich reformate stream may be used, for example, as the fuel gas stream feeding the anode of an electrochemical fuel cell after passing the reformate stream through a water gas shift reactor and other purification means such as a carbon monoxide selective oxidizer. Reformate is particularly well suited to start up a solid oxide fuel cell (SOFC) system because the purification step for removal of carbon monoxide is not required for an SOFC.

The hydrogen-rich reformate stream may also be used as a hydrogen fuel to fuel an engine. Hydrogen-fueled vehicles are of interest as low-emissions vehicles because hydrogen as a fuel or a fuel additive can significantly reduce air pollution and can be produced from a variety of fuels. Hydrogen provides the capability to run an engine with very lean fuel-air mixtures that greatly reduce production of NOx. Small amounts of supplemental hydrogen fuel may allow conventional gasoline internal combustion engines to reach nearly zero emissions levels. Commonly assigned U.S. Pat. No. 6,655,130 of Kirwan et al., entitled "System And Controls For Near Zero Cold Start Tailpipe Emissions In Internal Combustion Engines," discloses an on-board fuel reformer-engine system employing substantially 100% reformate fueling at start-up for near-zero cold start hydrocarbon and NOx engine emissions. The system and method provides for controlling the supply of one or a combination of reformate, liquid fuel, and air to the engine and exhaust catalyst to achieve low hydrocarbon and NOx emissions over a full range of engine operating conditions.

While hydrogen fuel may be stored on-board to provide an instant source of reformate fuel, on-board storage of reformate significantly increases system size, cost and complexity. For example, on-board storage may require high-pressure vessels, cryogenic containers if the hydrogen is to be stored as a compressed gas or liquid, or large volumes and weights if the hydrogen is to be stored as a hydride. In addition, storage of carbon monoxide may be a safety concern. Further, the refill time for hydrogen is substantially longer than that for gasoline when hydrogen is to be stored on-board.

What is needed in the art is a reformate-generating device comprising a rapid start up (or "fast light-off") system. What is further needed in the art is a rapid start-up catalytic reformer for producing reformate suitable for feeding a power generation system such as a fuel cell or engine.

SUMMARY OF THE INVENTION

A fast light-off catalytic reformer and method is provided. The reformer includes at least one reactor tube having an inlet for receiving a flow of fuel and a flow of air, a reforming catalyst disposed within the reactor tube for converting the fuel and air to a reformate stream, and an outlet for discharging the produced reformate stream. An ignition device is disposed within the reactor tube for initiating an exothermic reaction between the fuel and air and using the heat generated thereby to provide fast light-off of the reforming catalyst. The ignition device may be located at various positions within the reactor tube, as desired, such as, but not limited to, upstream of the reforming catalyst. An associated control system selects fuel and air flow delivery rates and operates the ignition device so as to achieve fast light-off of the reforming catalyst at start-up and to maintain the catalyst at a temperature sufficient to optimize reformate yield.

The method includes supplying a flow of premixed fuel and air to the catalytic reformer and igniting the fuel and air within the reactor tube to rapidly heat the reforming catalyst with the heat of combustion. The method also includes controlling the fuel and air delivery rate and the igniting so as to achieve fast light-off at start-up and to maintain the reforming catalyst at a temperature sufficient to optimize reformate yield.

The present fast light-off reformer and method advantageously provides a compact and efficient system. The present invention provides the further advantage of reducing the size of a discrete burner and associated system for flowing and exhausting hot burner gases in order to achieve and maintain an effective catalyst temperature.

The present fast light-off reformer and method provides the advantage of rapid production of high yields of reformate and is particularly useful for an on-board reforming strategy for meeting SULEV emissions with spark-ignition engines, especially with larger, higher emitting vehicles. The present fast light-off reformer and method is also well suited for providing rapid production of reformate to other power generation systems, such as fuel cells, and is particularly useful for start up and fueling solid oxide fuel cells.

These and other features and advantages of the invention will be more fully understood from the following description of certain specific embodiments of the invention taken together with the accompanying drawings.

BRIEF DESCRIPTION OF THE DRAWINGS

Referring now to the drawing, which is meant to be exemplary, not limiting.

DESCRIPTION OF THE PREFERRED EMBODIMENT

Figure 1:
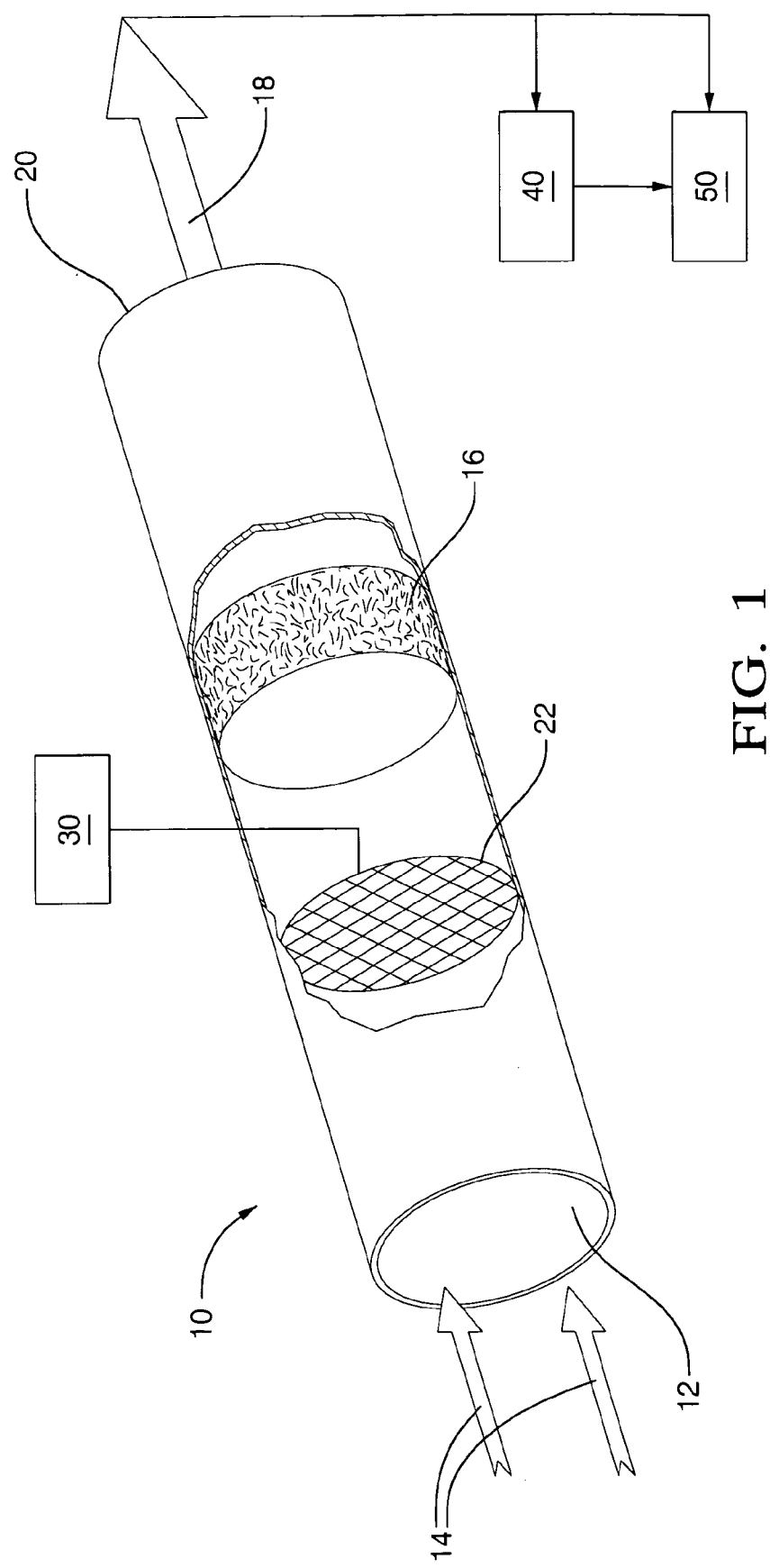
FIG. 1 is a perspective view, partially in section, of an embodiment of a fast light-off catalytic reformer in accordance with the present invention.

Turning to FIG. 1, a fast light-off catalytic reformer in accordance with one possible embodiment of the present invention includes a reactor tube 10 having an inlet 12 in a first end for receiving a flow of fuel and a flow of air, shown as combined fuel-air stream 14. Reactor tube 10 may be any shape, but typically comprises a substantially cylindrical reactor tube. While the present description discusses a single reactor tube 10, reforming catalyst 16, and ignition device 22, the present fast light-off reformer may comprise one or more reactor tubes, as desired.

Reforming catalyst 16 is disposed within the reactor tube 10. Reforming catalyst 16 may comprise any reforming catalyst suitable for converting the fuel feedstock and air to reformate, including, but not limited to, for example, rhodium, platinum, their alloys, and combinations thereof. Preferably, a protective coating or firewall (not shown) is disposed about catalyst 16. During operation, air and fuel 14 flows through inlet 12 and is converted in catalyst 16 to a hydrogen rich reformate fuel stream 18 that is discharged through outlet 20.

Ignition device 22 is disposed within the reactor tube 10 to initiate an exothermic reaction in fuel and air flow 14. Heat generated by this reaction is used to provide fast light-off (i.e., extremely rapid heating) of the reforming catalyst 16. The ignition device may be located upstream of the catalyst, at the front face thereof, within the catalyst, or at the rear face of the catalyst. In a preferred embodiment, the ignition device 22 is disposed within the reactor tube 10 upstream of the reforming catalyst 16, i.e., between inlet 12 and reforming catalyst 16. Ignition device 22 may be any device suitable for initiating exothermic reactions between fuel and air 14, including, but not limited to, a catalytic or non-catalytic substrate, such as a wire or gauze, for receiving electric current from a voltage source, a spark plug, a glow plug, or a combination thereof.

An associated control system (30) selects and maintains the appropriate fuel and air delivery rates and operates the ignition device 22 so as to achieve fast light-off of the reforming catalyst 16 at start-up and to maintain catalyst 16 at a temperature sufficient to optimize reformate 18 yield. The control means used herein may comprise any of various control means known in the art for providing air and fuel control and metering functions.

Excellent reformate yields from the reactor depend upon both a sufficiently high catalyst temperature and the appropriate air-fuel ratio. The optimum air-fuel mixture for producing reformate is very fuel rich, but leaner mixtures provide higher temperatures for rapidly heating the catalyst. The control system varies air-fuel ratio during start-up of the reformer to rapidly obtain both the temperatures and air-fuel mixtures required for high reformate yields.

The present fast light-off catalytic reformer and method produce rapid, high yields of reformate fuel. The produced reformate may be bottled in a vessel (40) or used to fuel any number of systems operating partially or wholly on reformate fuel. Such power generation systems (50) may include, but are not limited to, engines such as spark ignition engines, hybrid vehicles, diesel engines, fuel cells, particularly solid oxide fuel cells, or combinations thereof. The present fast light-off reformer and method may be variously integrated with such systems, as desired. For example, the present fast light-off reformer may be employed as an on-board reformer for a vehicle engine operating wholly or partially on reformate, the engine having a fuel inlet in fluid communication with the reformer outlet 20 for receiving reformate 18 therefrom. The present fast light-off reformer and method is particularly suitable for use as an on-board reformer for generating a fast supply of reformate 18 for initial start-up of a system. The present reformer and method is particularly advantageous for hydrogen cold-start of an internal combustion engine, providing a fast supply of hydrogen-rich reformate which allows the engine exhaust to meet SULEV emissions levels immediately from cold-start.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A power generation system employing a fast light-off reformer comprising:
   a catalytic reformer characterized by at least one reactor tube, said reactor tube having an inlet in a first end for receiving a flow of fuel and a flow of air, a reforming catalyst disposed within said reactor tube for converting said fuel and said air to a reformate stream, and an outlet in a second end for discharging said reformate stream;
   an ignition device disposed within said reactor tube for initiating an exothermic reaction between said fuel and said air and using heat energy generated thereby to provide fast light-off of said reforming catalyst;
   a control system for selecting fuel and air flow rate and operating said ignition device so as to achieve fast light-off of said reforming catalyst at start-up and to maintain said catalyst at a temperature sufficient to optimize reformate yield; and
   a power generation system fueled at least partially by reformate provided by said fast light-off reformer, said power generation system having a fuel inlet in fluid communication with said reformer outlet.

2. The fast light-off reformer-power generation system of claim 1, wherein said power generation system is an engine, a spark ignition engine, a hybrid vehicle, a diesel engine, a fuel cell, a solid oxide fuel cell, or a combination thereof.

* * * * *